United States Patent
Tan et al.

(10) Patent No.: US 10,574,783 B2
(45) Date of Patent: Feb. 25, 2020

(54) HEADSET DEVICE AND A DEVICE PROFILE MANAGEMENT SYSTEM AND METHOD THEREOF

(71) Applicant: RAZER (ASIA-PACIFIC) PTE. LTD., Singapore (SG)

(72) Inventors: Min-Liang Tan, Singapore (SG); Shiuwen Wong, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/952,046

(22) Filed: Apr. 12, 2018

(65) Prior Publication Data

US 2018/0234521 A1 Aug. 16, 2018

Related U.S. Application Data (62) Division of application No. 14/382,263, filed as application No. PCT/SG2012/000058 on Feb. 29, 2012, now Pat. No. 9,973,591.

(51) Int. Cl.
*G06F 15/177* (2006.01)
*H04L 29/08* (2006.01)
(Continued)

(52) U.S. Cl.
CPC ............ *H04L 67/306* (2013.01); *H04L 63/08* (2013.01); *H04R 5/04* (2013.01); *H04S 5/005* (2013.01);
(Continued)

(58) Field of Classification Search
None
See application file for complete search history.

(56) References Cited

U.S. PATENT DOCUMENTS

| 7,873,610 B2 | 1/2011 | Poulsen |
| 7,877,121 B2 | 1/2011 | Seshadri et al. |

(Continued)

FOREIGN PATENT DOCUMENTS

| CN | 1650252 A | 8/2005 |
| CN | 101488979 A | 7/2009 |

(Continued)

OTHER PUBLICATIONS

International Search Report and Written Opinion, dated Nov. 23, 2012, for the corresponding International Application No. PCT/SG2012/000058.

(Continued)

*Primary Examiner* — Mohamed Ibrahim
(74) *Attorney, Agent, or Firm* — Polsinelli PC (57) ABSTRACT

Most computer operating systems are able to automatically configure the coupled computer peripheral audio device for use with the computer operating system without the need for installation of a specific driver. However, when these computer peripheral audio devices are detected by the computing system, a generic audio device control configuration is often assigned to them and whatever customised settings previously configured by the user will be lost and replaced with a new set of unfamiliar setting. This poses much inconvenience and hassle to gainers when they use a different computing system or machine. Described according to an embodiment of the invention is a headset device and a device profile management method, operating on a computing cloud, comprising steps for receiving client data provided by a computing system detecting coupling of an audio device thereto and for retrieving configuration data corresponding to the client data for use in configuring the audio device by the computing system.

12 Claims, 6 Drawing Sheets

(51) Int. Cl.
*H04R 5/04* (2006.01)
*H04L 29/06* (2006.01)
*H04S 5/00* (2006.01)
*H04S 7/00* (2006.01)
*H04R 1/10* (2006.01)

(52) U.S. Cl.
CPC ...... *H04R 1/1041* (2013.01); *H04R 2201/107* (2013.01); *H04S 7/307* (2013.01); *H04S 2400/13* (2013.01); *H04S 2420/01* (2013.01)

(56) References Cited

U.S. PATENT DOCUMENTS

| | | | |
|---|---|---|---|
| 7,958,276 | B2 | 6/2011 | Storey et al. |
| 8,155,335 | B2 | 4/2012 | Rutschman |
| 8,229,145 | B2 | 7/2012 | Coughlan et al. |
| 8,816,813 | B2 | 8/2014 | Tondering |
| 9,363,348 | B2 | 6/2016 | Jellinek |
| 2003/0123676 | A1 | 7/2003 | Schobben |
| 2004/0119894 | A1 | 6/2004 | Higgins et al. |
| 2005/0235221 | A1 | 10/2005 | Asoh et al. |
| 2006/0008106 | A1* | 1/2006 | Harper ............... H04R 1/1033 381/374 |
| 2006/0080415 | A1 | 4/2006 | Tu |
| 2007/0049198 | A1 | 3/2007 | Walsh et al. |
| 2007/0098198 | A1* | 5/2007 | Hildebrandt ......... H04R 1/1075 381/370 |
| 2007/0142942 | A1 | 6/2007 | Hyatt |
| 2008/0311966 | A1* | 12/2008 | Klein ............... H04M 1/05 455/575.2 |
| 2009/0129601 | A1 | 5/2009 | Ojala et al. |
| 2010/0205236 | A1 | 8/2010 | Ochiai |
| 2011/0014957 | A1 | 1/2011 | Sugimori et al. |
| 2011/0075851 | A1 | 3/2011 | LeBoeuf et al. |
| 2011/0106825 | A1* | 5/2011 | Xiang ............... G06F 17/30775 707/756 |
| 2011/0301729 | A1* | 12/2011 | Heiman ............... H04S 7/301 700/94 |
| 2012/0052948 | A1 | 3/2012 | Soelberg et al. |
| 2012/0201405 | A1 | 8/2012 | Slamka et al. |
| 2014/0314261 | A1 | 10/2014 | Selig et al. |

FOREIGN PATENT DOCUMENTS

| | | |
|---|---|---|
| CN | 101809548 A | 8/2010 |
| CN | 102176762 A | 9/2011 |
| EP | 1657961 A | 5/2006 |
| TW | 201116031 A | 5/2011 |
| WO | WO 2008042242 | 4/2008 |

OTHER PUBLICATIONS

First Office Action dated May 26, 2016, 11 pages, with English translation, for corresponding Taiwan Application No. 102107042.

Second Office Action dated May 3, 2016, 15 pages, with English translation, for corresponding Chinese Patent Application No. 201280072696.8.

English translation of the First Office Action dated Sep. 22, 2015, 13 pages, for corresponding Chinese Patent Application No. 201280072696.8.

Patent Examination Report No. 2, dated Oct. 12, 2015, 4 pages, for corresponding Australian Patent Application No. 2014262196.

Extended European Search Report dated Sep. 21, 2015, 13 pages, for the corresponding European Patent Application No. 12870118.2.

* cited by examiner

| 31 Device profiles | 36 Configuration data | 40 User Identifier | 42 Authentication data |
|---|---|---|---|
| ||||  | ||||  | ||||  | ||||  |

FIG. 6

HEADSET DEVICE AND A DEVICE PROFILE MANAGEMENT SYSTEM AND METHOD THEREOF

CROSS REFERENCE TO RELATED APPLICATIONS

This application is a divisional of U.S. application Ser. No. 14/382,263 having a 35 U.S.C. § 371 date of Oct. 7, 2014, which is a national stage entry of PCT/SG2012/000058 filed on Feb. 29, 2012; both of which are expressly incorporated by reference herein in their entireties.

FIELD OF INVENTION

The present invention relates generally to a headset device based on virtualised surround sound technologies based on Head Related Transfer Functions (HRTF). In particular, the invention relates to a HRTF-based headset device and the system and method for managing the device for computing systems.

BACKGROUND

Many players in the audio industry that have used principles of HRTF in audio devices to recreate virtual surround sound. Some device manufacturers rely solely on the principles of HRTF, and utilise filters on sounds to alter the phase and gain of those sounds which provide positional cues. This is a very rudimentary method and does not work on most users effectively as certain sounds only appear louder or softer or merely seem to echo in each ear, instead of accurate reproduction of sounds to mimic the spatialisation effects as experienced in real-life. Listening to sounds via bone conduction, for example, through commercially available "bonephones", may seem to produce sounds with stereo effects, but true 3D-spatialisation effects have yet to be achieved in current technologies.

Others use FFT (Fast Fourier transform) convolution to process a number of variables, such as the phase, gain, as well as refractions of sounds off the user's head, pinnae and body. This is a more accurate method, but many such technologies provide sound filters that are short and can only provide a limited number of positional cues before the digital signal processing (DSP) begins processing other new sounds.

Both these methods will give sounds with positional cues that the user's brain can use to determine the position of a sound, but are associated with DSPs that can only process algorithms and variables at 34 MIPS (Millions of Instructions per Second).

In addition, due to variations in the shape, size and pinnae of the ears across individuals of a population, how a sound is perceived is also different across individuals. Thus, while select individuals consisting of approximately 20% of the population may be able to experience the virtual surround sound through current offerings of HRTF devices, the sound reproduction remains unconvincing for the remaining others. The low rate of true reproduction of virtual surround sound in current offerings of HRTF devices is also due to the fact that positional cues of recorded sounds are based on a single reference recording of a mannequin's head. In the case for most gamers, the virtual surround sound that is reproduced in current generation HRTF technologies are not suited for high-precision gaming where accurate surround sound environments are contributing factors towards a gamer's overall speed, precision and control in a game. Hence, there is an unmet need for headset devices which can provide true-to-life positional audio/virtual surround sound and which can be customised for consistent optimum audio performance for all gamers.

Further, as speed and accuracy are of significant importance to gamers an individual gamer's familiarity and consistency in the audio settings and/or audio device configurations may determine how one performs in the game. Typically, frequent gamers have a specific set of customised device configurations uniquely suited for their game play. For example, an individualised combination of keys specific to a gamer's preference or optimized for a gamer's performance on a user interface (UI) device such as a keyboard can be programmed to initiate an event during gameplay. In the case of audio/headset devices, should a calibration system exist, such calibration settings can also be programmed and saved. Further, owing to the unique physical qualities of each individual's ears, there can be calibration of audio settings and/or headset device settings to optimise virtual surround sound performance for the individual. Gamers often do not break away from this set of configurations as it allows them familiarity and consistency, and hence speed and control during gaming.

It is not uncommon for gamers to be equipped with their own set of preferred peripheral devices. Computer peripheral devices include but are not limited to headset/audio devices, computer mice, keyboards, handheld gaming consoles and joysticks. Known computer peripheral devices are typically interchangeable and can be used with different computer systems and platforms. Most computer operating systems are able to automatically configure the coupled computer peripheral device for use with the computer operating system without the need for installation of a specific driver. However, when these peripheral devices are detected by the computing system, a generic device control configuration is often assigned to them and whatever customised settings previously configured by the user will be lost and replaced with default settings. This poses much inconvenience and hassle to gamers when they enter LAN-gaming shops or utilise computers for their gaming pleasures as they would have to reconfigure the control settings to suit their preferences.

There is, therefore, an apparent need for a method whereby these device settings and configurations can be stored and retrieved on the fly so that users can do away with the hassle of re-configuring their control settings, including audio settings, whenever they use a different platform to access the different peripheral devices, including different audio devices.

SUMMARY

In accordance with a first aspect of the invention, there is disclosed a profile management method comprising receiving client data provided by a computing system and the client data comprising device data is descriptive of an audio device in signal communication with the computing system. The device data is further descriptive of the user interactions identifiable by the audio device and one of a plurality of device profiles is associated with the device data and each of the plurality of device profiles having configuration data associated therewith; In a further step, the computing system is provided the configuration data associated with the one of the plurality of device profiles to the computing system for configuring operation of the audio device with the computing system, in response to at least a portion of the user interactions identifiable by the audio device.

In accordance with a second aspect of the invention, there is disclosed a profile management system comprising a controller module for receiving client data provided by a computing system, and the client data comprises device data being descriptive of an audio device in signal communication with the computing system. The device data is further descriptive of the user interactions identifiable by the audio device. The profile management system also comprises a storage module having stored thereon a plurality of device profiles, each of the plurality of device profiles having device configuration data associated therewith. The profile management system further comprises a processor module for associating one of a plurality of device profiles stored on the storage module with the device data, and the configuration data associated with the one of the plurality of device profiles is providable by the controller module to the computing system for configuring operation of the audio device with the computing system in response to at least a portion of the user interactions identifiable by the audio device.

In accordance with a third aspect of the invention, there is a disclosed non-transitory machine readable medium having stored therein a plurality of programming instructions, which when executed, the instructions cause the machine to receive client data provided by a computing system. The client data comprising device data is descriptive of an audio device in signal communication with the computing system and the device data is further descriptive of the user interactions identifiable by the audio device. The plurality of programming instructions when executed, also causes the machine to associate one of a plurality of device profiles with the device data and each of the plurality of device profiles having configuration data associated therewith. The plurality of programming instructions when executed, further causes the machine to provide the configuration data associated with the one of the plurality of device profiles to the computing system for configuring operation of the audio device with the computing system in response to at least a portion of the user interactions identifiable by the audio device.

In accordance with a fourth aspect of the invention, there is disclosed an audio device comprising a storage module for storing a control function, the control function being associated with head-related structure of a user. The audio device also comprises a processor for receiving audio signals being descriptive of audio sounds and spatial positions corresponding with the audio sounds, the processor for processing the received audio signals into control signals based on the control function. The audio device further comprises a transducer for transducing control signals into the audio sounds for delivery to the user when the audio device is in use thereby and the spatial positions of the audio sounds are processed by the processor to substantially conform to the head-related structure of the user based on the control function.

DETAILED DESCRIPTION

Reference will now be made in detail to an exemplary embodiment of the present invention, examples of which are illustrated in the accompanying drawings. While the invention will be described in conjunction with the embodiment, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention For purposes of brevity and clarity, descriptions of embodiments of the present invention are limited hereinafter to the transfer and management of device profiles, in particular, device configurations, for a client device associated with a computing system. This however does not preclude embodiments of the invention where fundamental principals prevalent among the various embodiments of the invention such as operational, functional or performance characteristics are required.

An exemplary embodiment of the invention, a profile management method 100, is described hereinafter. The profile management method 100 is preferably for managing configuration of audio devices 18 including, but not limited to, headset device coupled to a computing system 20 in communication with a computing cloud 22.

The computing system may comprise, but is not limited to, a personal computer (PC), a network server, a laptop, a computer tablet, a gaming console, or a smartphone. An audio device 18, may comprise, but is not limited to, a headset device featuring HRTF technology or a pair of earphones. A headset device featuring HRTF technology typically allows for audio playback of the source material that has been set to output 5.1 or 7.1 (channels) audio through multi-sound channels within the headset device.

Figure 1:
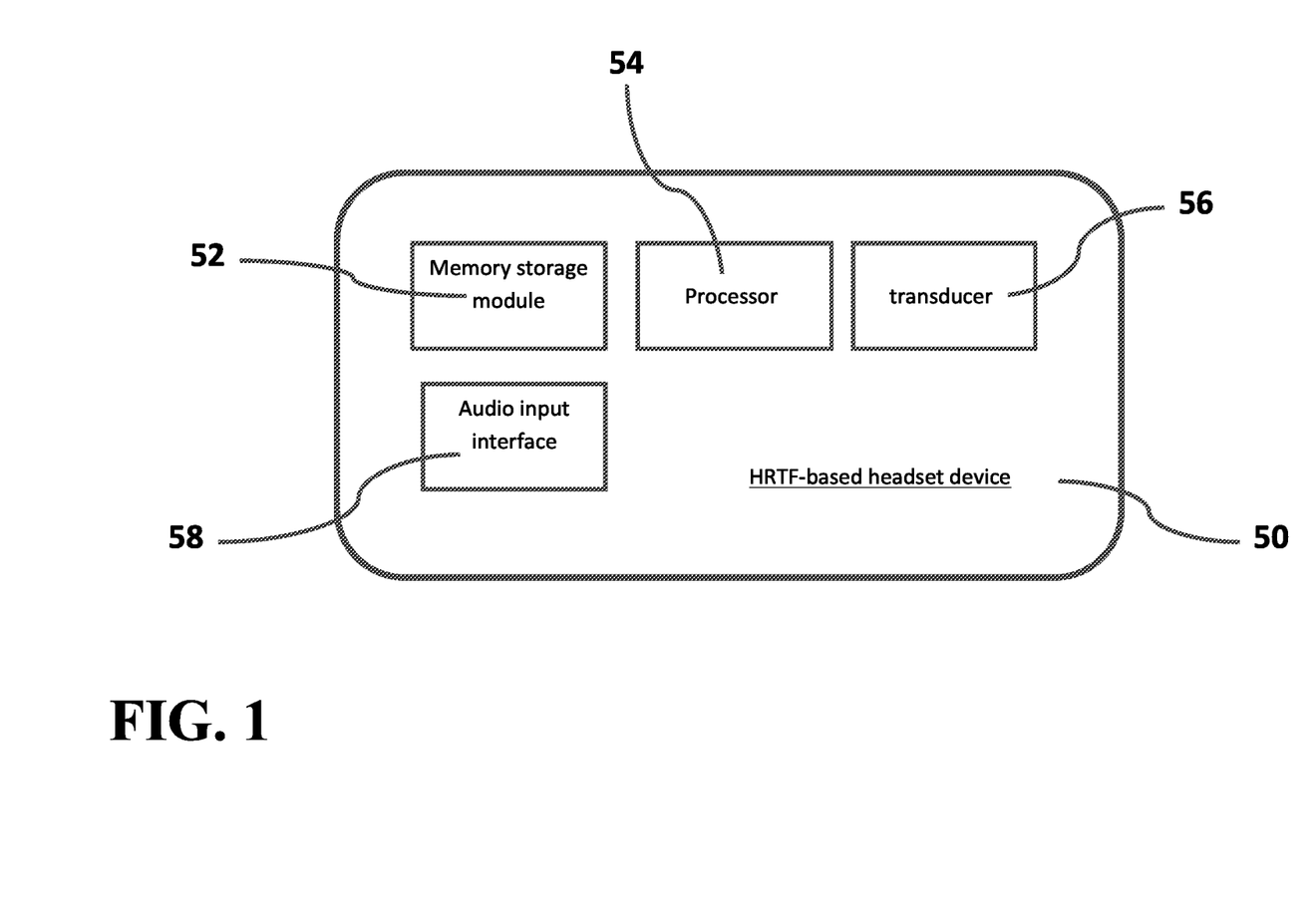
FIG. 1 shows a system diagram of a HRTF-based headset device.

An exemplary embodiment of the HRTF-based headset device 50, with reference to FIG. 1, comprises a memory storage module 52, a processor 54, a transducer 56 and an audio input interface 58. The storage module 52 may comprise, but are not limited to, a built-in flash memory or a removable memory disk, for the storage of saved user settings of the HRTF-based headset device 50. The processor 54 executes a plurality of programming instructions which may be stored within the storage module 52 to result in the communication of signals between the HRTF-based headset, a computing system and a computing cloud which the HRTF-based headset may be coupled to, during the running of various functions as programmed in the programming instructions. The transducer 56 comprises but are not limited to, a pair of ear cups or a pair of ear phones. The audio input interface 58 comprises a device which allow for the input of audio sequences for sound recordings or voice recordings, such as a microphone.

The configuration of a HRTF-based headset device 50 settings comprises calibration of user settings in relation to at least one of the shape, size and pinnae of the user's ears. The configuration of a HRTF-based headset device 50 settings may also comprise the use of a device, such as but are not limited to, a microphone forming part of the HRTF-based headset device 50, to obtain configurations of the users' ears, including but not are limited to, the shape, size and pinnae of the ears. For example, the length of a microphone may include measurement guides to obtain at least an approximation of various physical aspects of a user's ears.

Additionally, the user settings of a HRTF-based headset device 50 may be configured according to at least one of a plurality of virtualized ear pinnae configurations from a database, the plurality of virtualized ear pinnae configurations being indicative of at least a majority of the human population. The database of a plurality of virtualized ear pinnae configurations may be located on at least one of a storage module 52 within the HRTF-based headset device 50, a storage module 52 within a computing system coupled to the HRTF-based headset device 50 and on a computing cloud coupled to the HRTF-based headset device 50. The processor 54 of the HRTF-based headset device 50 may further process the source material of the audio output based on the saved user settings of the HRTF-based headset.

Further described, with reference to FIGS. 2 to 6, is a device profile management system 24, residing on the computing cloud 22, for applying the profile management method 100.

Generally, the profile management system 24 enables a configuration for audio devices 18 to be created by a user so that the configuration can be readily accessed from different locations or from different computer terminals when the same or similar type of audio device 18 is used. For example, when a user brings a HRTF-based headset device 50 from location to location, the user does not have to reconfigure the HRTF-based headset device 50 at each new location or at a new computer terminal. The configuration for the audio device 18, including the preferred settings therefor, are downloadable via the computer terminal the audio device 18 is coupled to. This even applies to newly acquired devices where the audio device 18 thereof can be configured for use "out of the box" via downloading the corresponding configuration previously created by a user, a third party, the device manufacturer or an application developer, for example, a gaming application. The configurations for the audio devices 18 are preferably stored on one or more servers with each configuration catering to a specific, or similar, audio device type and relating to a specific user identified by a user identifier. Download of the configuration can be initiated via various means including by the coupling of the audio device 18 to a computer system, connecting to a specific network address, for example an IP address or a URL, launching of a particular application or game application or through operating of controls within an application. Preferably, information on the audio device type is providable to the one or more server so that the configuration corresponding to the audio device type, and preferably further corresponding to a particular user ID, can be identified for download and subsequent configuration of the corresponding audio device 18.

With reference to FIGS. 2 to 6, the computing cloud 22 comprises one or multiple server systems 26 inter-networked and configured to function as the profile management system 24. Communication pathway between the computing cloud 22 and the computing system 20 is preferably provided via a local area network (LAN), a wide area network (WAN), the Internet, cellular networks, data networks, dedicated networks or a combination of any thereof.

Figure 2:
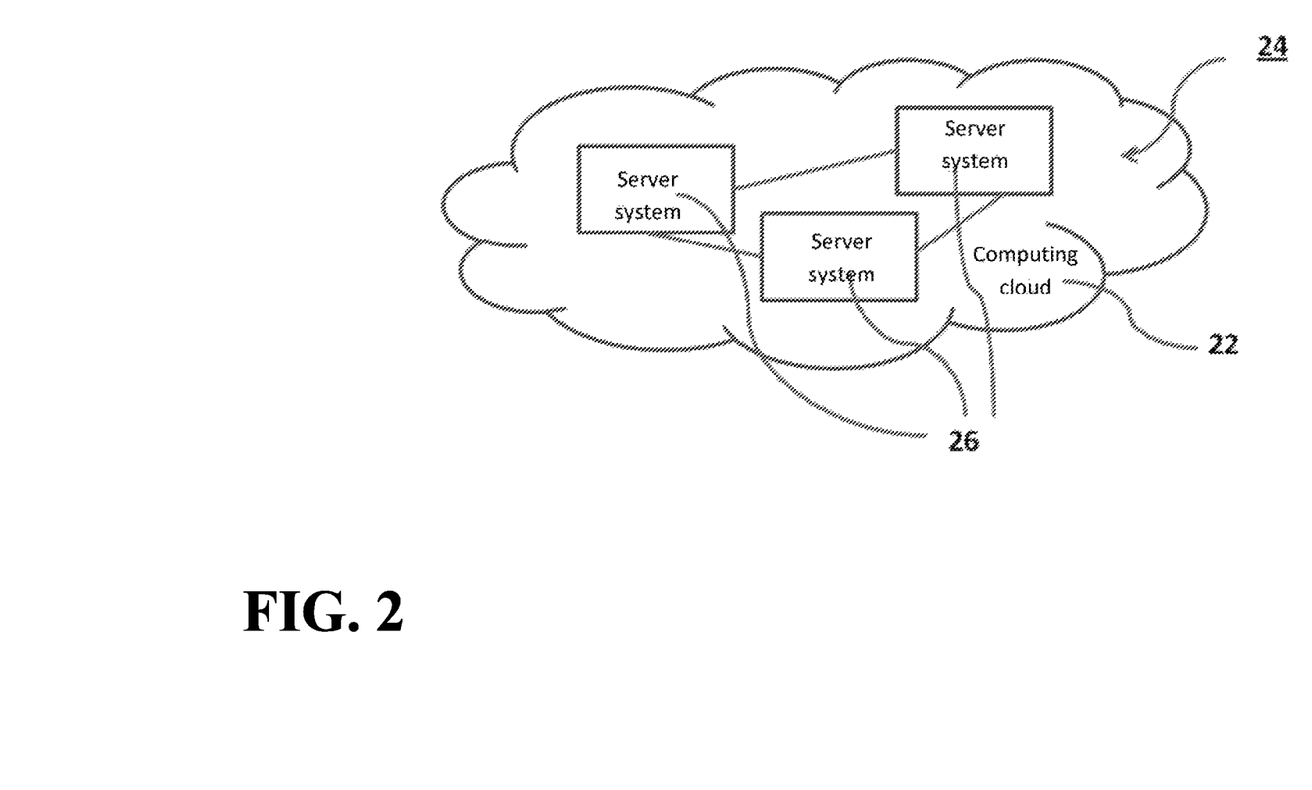
FIG. 2 shows a system diagram of a profile management system residing on a computing cloud according to an exemplary embodiment of the invention.
Figure 3:
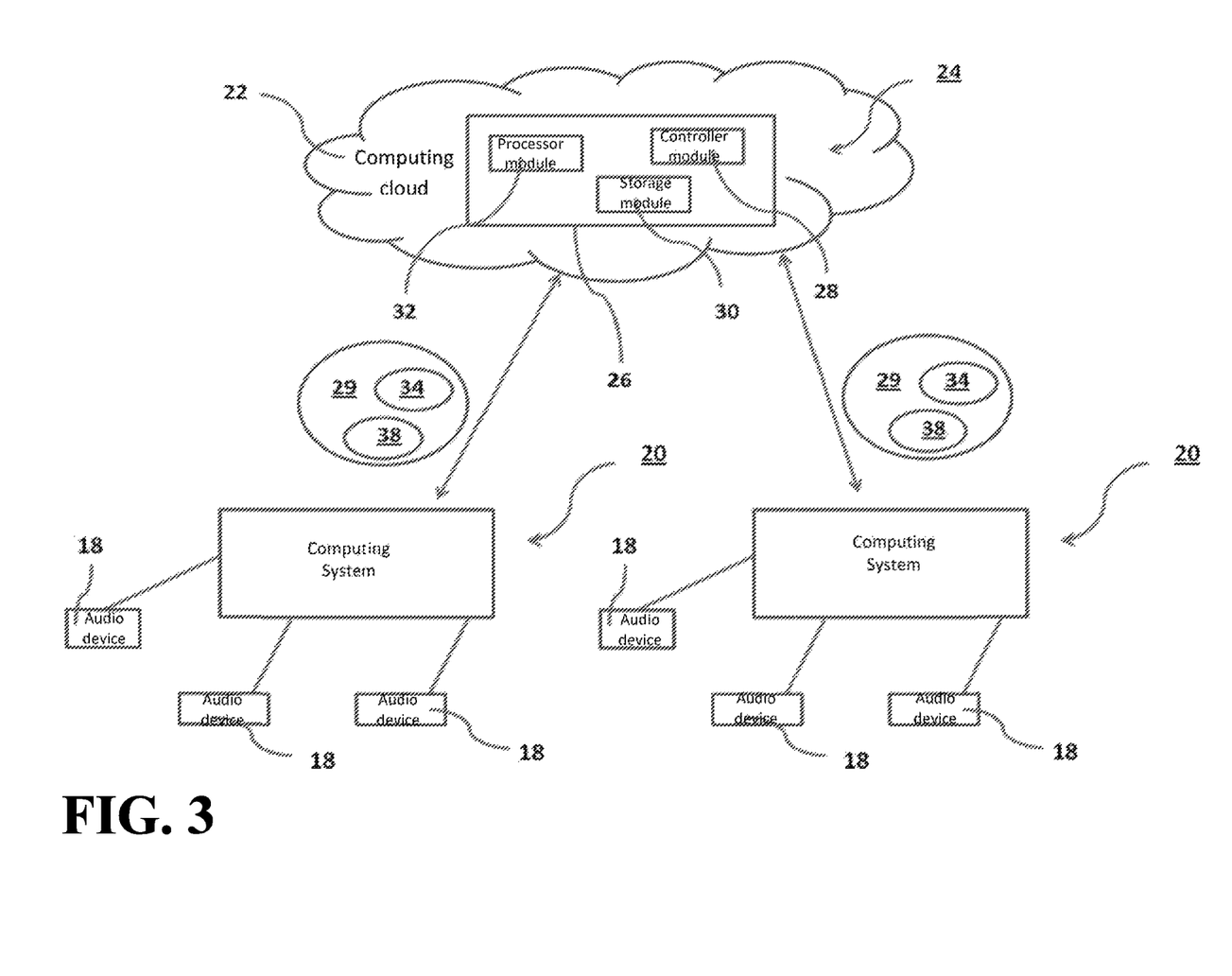
FIG. 3 shows a system diagram of the profile management system of FIG. 2 with user-interfaces in signal communication with computing systems coupled thereto.

The profile management system 24 comprises a controller module 28 for receiving client data 29 provided by the computing system 20, a storage module 30 for storing a plurality of device profiles 31 and a processor module 32. The client data 29 comprises device data 34 for associating with one of the plurality of the device profiles 31 by the processor module 32.

Figure 4:
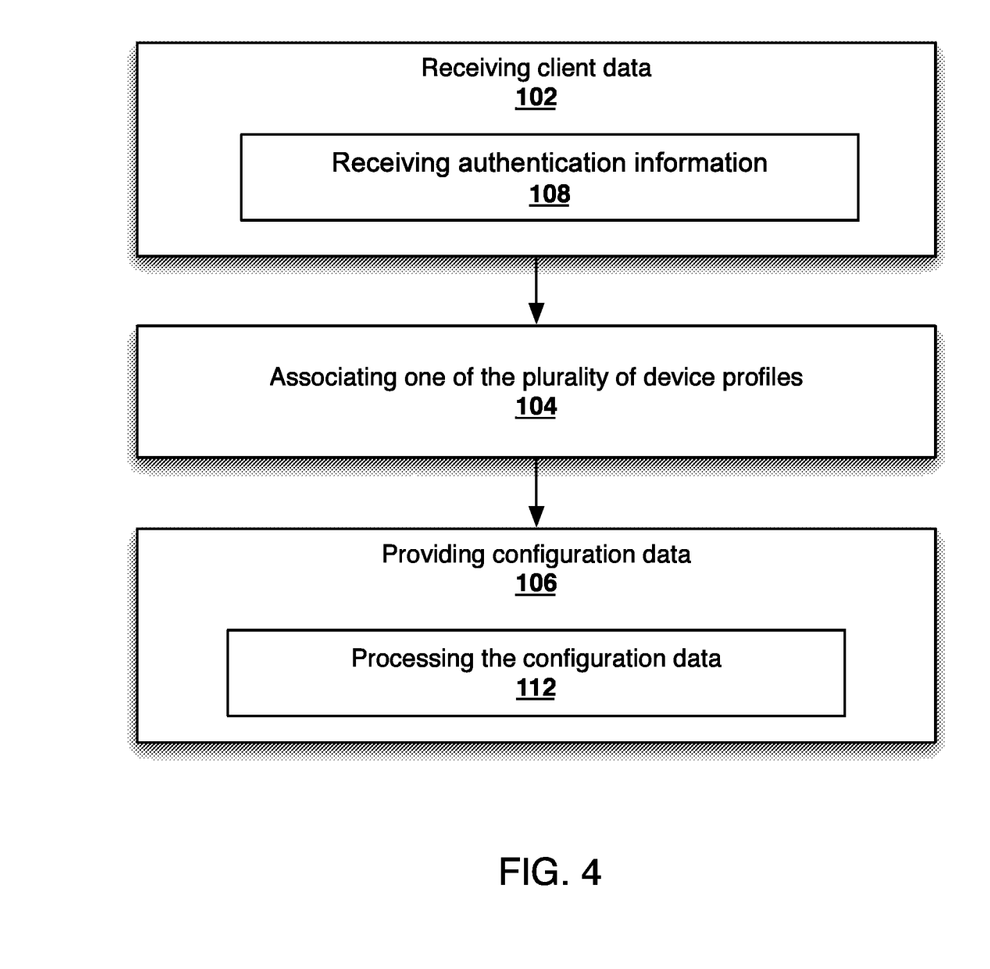
FIG. 4 shows a process flow diagram of a profile management method for implementation by the profile management system of FIG. 2.

The profile management method 100 comprises a step 102 of receiving the client data 29 providable by the computing system 20 by the profile management system 24, a step 104 of associating one of the plurality of device profiles 31 within the profile management system 24 with the client data 29 and a step 106 of providing configuration data 36 associated with one of the plurality of device profiles 31 to the computing system 20 for configuration of the audio device 18 thereafter.

The device data 34 is preferably descriptive of the audio device 18 associated with the computing system 20. The device data 34 is further descriptive of the user interactions identifiable by the audio device 18. Preferably, the audio device 18 is one of a computer peripheral audio device coupled with an interface formed integral with the computing system. Examples of computer peripheral audio devices include but are not limited to, a HRTF-based headset device or earphones. Alternatively, the audio device 18 includes devices which are couplable with a computing system for use with or forms part of the computing system 20. For example, a HRTF-based headset device 50 may comprise a jack plug (the male connector for transmitting audio signals) of a HRTF-based headset which is connectable to a jack socket (the female connector for transmitting audio signals) of a computing system. A HRTF-based headset may also be couplable with a computing system via a wireless connection such as, but are not limited to, a infra-red-based connection, a Bluetooth connection, or a wireless internet connection. Detection and recognition of the audio device 18, or its functional equivalent, occurs when the audio device 18 is in signal communication with the computing system 20. The computing system 20 generates the device data 34 for the audio device 18 when the audio device 18 is recognised thereby. For example, if the audio device 18 is a HRTF-based headset device 50, the user interactions identifiable by at least one of the HRTF-based headset device 50 and the computing system comprise, but are not limited to, the connection of the HRTF-based headset device 50's jack plug to the computing system's jack socket; wireless coupling of the HRTF-based headset device 50 with the computing system; detection of sound input through the audio input interface 58 such as a microphone; volume adjustment via volume controls coupled to the HRTF-based headset device 50; sound channel adjustment and selection via sound channel adjustment/selection controls coupled to the HRTF-based headset device 50; volume adjustment of each sound channel via sound channel volume controls attached to the HRTF-based headset device 50; selection of at least one of a plurality of virtualized ear pinnae configurations from a database for calibration of the HRTF-based headset device 50; and inputting of user settings through an interface for calibration of the HRTF-based headset device 50.

When a user couples the audio device 18 to the computing system 20 in network communication with the computing cloud 22, the profile management system 24 is able to receive the client data 29 generated by the computing system 20. The audio device 18 may be connected to the computing system 20 via wired or wireless signal connection. Detection of the audio device 18 can be configured by the user to be in response to coupling of the audio device 18 to the computing system 20 or to be effected by the user by executing a routine or application on the computing system. Application programming interfaces (APIs) or components of software development kits (SDKs) is preferably made available for programmers, game developers and application developers to incorporate the function of detecting the audio device 18 onto their computing systems 20 and software applications. This will provide the user with better control over how and when the audio device 18 is to be detected for discovery and sending of the client data 29 to the profile management system 24. The APIs and components of SDKs may be provided for development of auto-executable routines residing on the audio device 18 for initiating the profile management method 100 upon detection thereof by the computing system 20 when the audio device 18 is coupled thereto. In such an instance, the device data 34 specific to the audio device 18 may be pre-defined and preloaded onto the audio device 18, preferably, onto a memory module residing on the audio device 18. For example, the device data comprising, but are not limited to, saved user settings or a pre-selected at least one of a plurality of virtualized ear pinnae configurations from a database for a HRTF-based headset device 50 may be downloaded onto the HRTF-based headset device 50's storage module 52 from the computing cloud, or uploaded from the storage module 52 of the HRTF-based headset device 50 onto the computing cloud.

Figure 6:
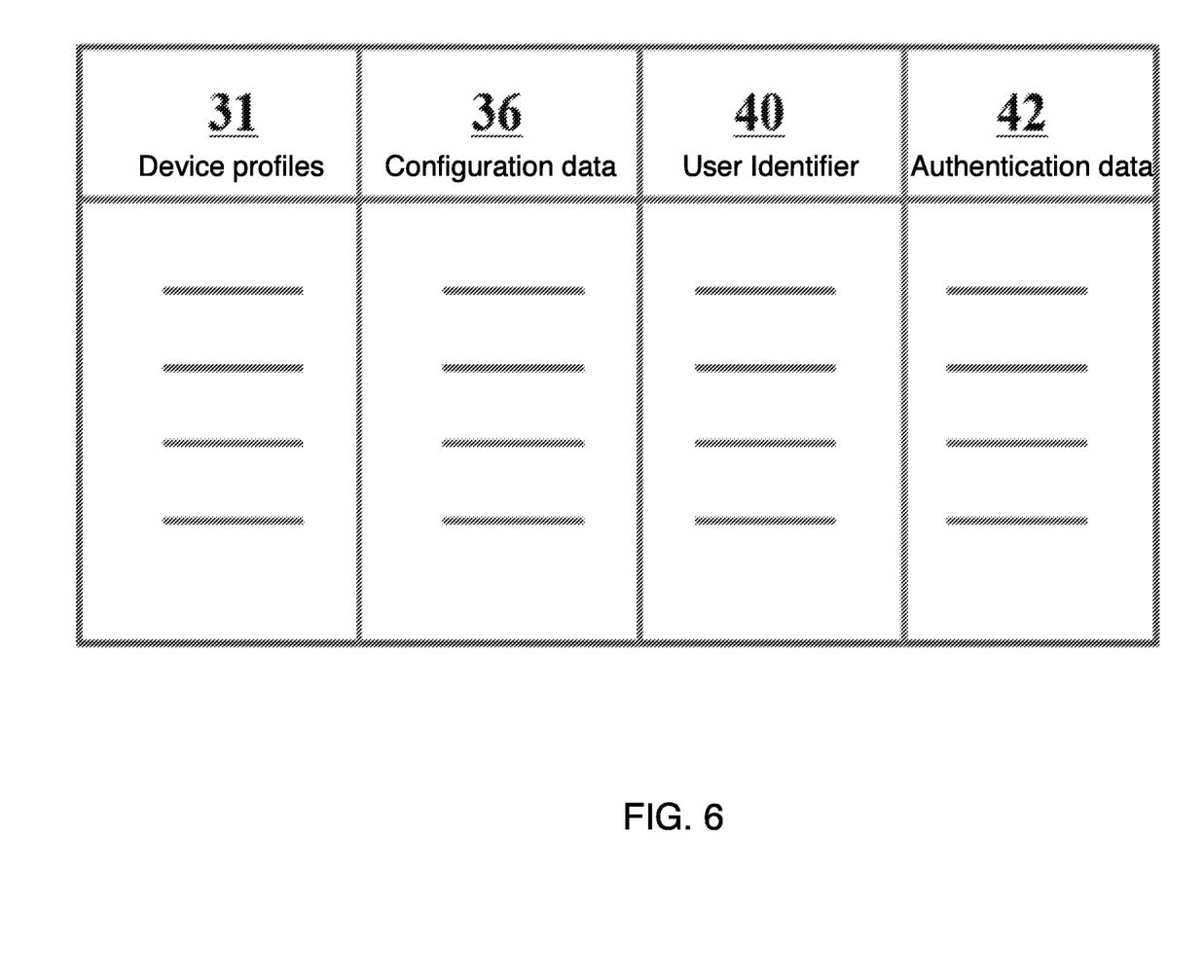
FIG. 6 shows an arrangement of device profile, configuration data, user identifier and authentication data residing on the profile management system of FIG. 2.

Preferably, the client data 29 further comprises identifier data 38 uniquely matched to at least one of a plurality of user identifiers 40 residing on the storage module 30. Upon receiving of the client data 29 by the profile management system 24 in the step 102, the profile management system 24 further processes the client data 29 for either user registration or log-on to the profile management system 24. For an existing user with an identity existing as one of the plurality of user identifiers 40 on the storage module 30, access to the profile management system 24 triggers the processor module 32 to associate the particular one of the user identifiers 40 with the identifier data 38. Upon associating the one of the user identifiers 40 with the identifier data 38, the one of the device profiles 31 and the configuration data 36 corresponding thereto are consequently identified. As an alternative over the identifier data 38 or in the absence of the identifier data 38, the device data 34 may be used for identifying the corresponding one of the device profiles 31 and the corresponding configuration data 36. In an event where none of the device profiles 31 exactly matches the device data 38, a closest matching one of the device profiles 31 may be selected instead. The controller module 28 can be configured to select a closest matching one of all the device profiles 31 on the storage module 30 or a closest matching one of only the device profiles 31 associated with a particular one of the user identifiers 40.

In an example of use of the profile management system 24, a user couples his HRTF-based headset device 50, the audio device 18, to a public computer, the computing system 20. One or both of the HRTF-based headset device 50 and the public computer may be pre-loaded with a sub-routine to automatically connect to the profile management system 24 for initiating the profile management method 100. Alternatively, the user can manually connect with the profile management system 24, for example, via a URL using a web browser. Once the profile management method 100 has been initiated, the HRTF-based headset device 50 will send information, the client data 19, to the profile management system 24 indicating that it is of a HRTF-based headset device 50 type, the device data 34. The sent information can include the user's name or a user identifier, the identifier data 38. On the profile management system 24, the user identifier 40 matching with the user's name may have multiple device profiles 31 associated therewith, for example various types of devices including, but are not limited to, a HRTF-based headset device 50, 3-D mouse, a specific model of gaming mouse and a multi-touch device. With the sent information indicating that the HRTF-based headset device 50 is of a HRTF-based headset device 50 type, the profile management system 24 can isolate the corresponding one of the multiple device profiles 31 for extracting the configuration data 36 corresponding 36 thereto. The configuration data 36 can include, for the HRTF-based headset device 50, a library of, but not limited to, audio settings and corresponding instructions for download to the public computer for configuring use of the HRTF-based headset device 50 with the public computer. Upon the HRTF-based headset device 50 being configured with the public computer, the user can immediately interact with the HRTF-based headset device 50 to generate instructions with audio settings the user is familiar with without having to recalibrate or reconfigure audio settings and corresponding instructions.

In another example of use of the profile management system 24; the HRTF-based headset device 50 is a newly acquired device connectable to the profile management system 24, via the user's personal computer, the computing system 20, for locating and downloading a popular audio settings library, a personal audio settings library or a library of audio settings provided by the manufacturers of the HRTF-based headset device 50, the configuration data 36 for use in configuring the HRTF-based headset device 50 with the user's personal computer. In yet another example of use of the profile management system 24, the audio device 18 is a HRTF-based headset device 50 for use with a public computer, the computing system 20. A user with his preferred settings, the configuration data 36, stored on the profile management system 24 is able to connect the public computer to the profile management system 24 for downloading the configuration data 36 to the public computer. The configuration data for the gaming mouse could include a popular audio settings library, a personal audio settings library or a library of audio settings provided by the manufacturers. The availability of the configuration data 36 on the profile management system 24 allows the user to quickly configure the HRTF-based headset device 50, or other audio devices 18, when using the public computer.

For retrieval of configuration data 36 from the profile management system 24 in the step 104, the user may either log-on to the profile management system 24 to retrieve stored configuration data 36 accessible to the public or choose to retrieve device data previously uploaded to the profile management system 24 associated with the user identifier 40 belonging to the user. Download of the configuration data 36 by other users is preferably determined by permission settings associated with the configuration data 36. Upon receiving client data 29 by the controller module 28, the profile management system 24 may initiate automated download of the configuration data 36 associated with the device profile 31 matching with the device data 34 of the provided client data 29 in the step 106.

Preferably, the step 102 of receiving client data 29 comprises a step 108 of receiving authentication information (unreferenced) from the computing system 20, for example a password provided by a user, to authenticate the identifier data 34 using the authentication data 42 corresponding thereto. Preferably, the profile management system 24 is configured such that the configuration data 36 in association with the identified one of the device profiles 31 will only be provided by the controller module 28 to the computing system 20 in the step 106 when the identifier data 34 is authenticated. Preferably, the configuration data 36 substantially defines interactions between the audio device 18 and at least one of an application and an operating platform operating on the computing system 20. In both gaming and non-gaming applications, the configuration data 36 of a HRTF-based headset device 50 can be the user settings comprising, but are limited to, calibrations according to the user ears' physical specifications or the pre-selection of at least one of a plurality of virtualized ear pinnae configurations, audio output volume settings, audio input volume settings such as the microphone volume settings of a microphone of the HRTF-based headset device 50, sound channel adjustment settings, sound channel volume settings and voice-activated commands through a microphone of the HRTF-based headset device 50.

When there exists a mismatch of operating platforms supported by the computing system 20 and which the stored configuration data operates on, the step 106 comprises a step 112 of processing the configuration data 36 for compliance with an operating platform so that the configuration data 36 downloadable from the profile management system 24 can be correctly recognised and configured for operation of the audio device 18 with the computing system 20.

The operating platform is definable by platform data (unreferenced) constituting a portion of the client data 29 generatable by the computing system 20 for provision to the profile management system 24.

Figure 5:
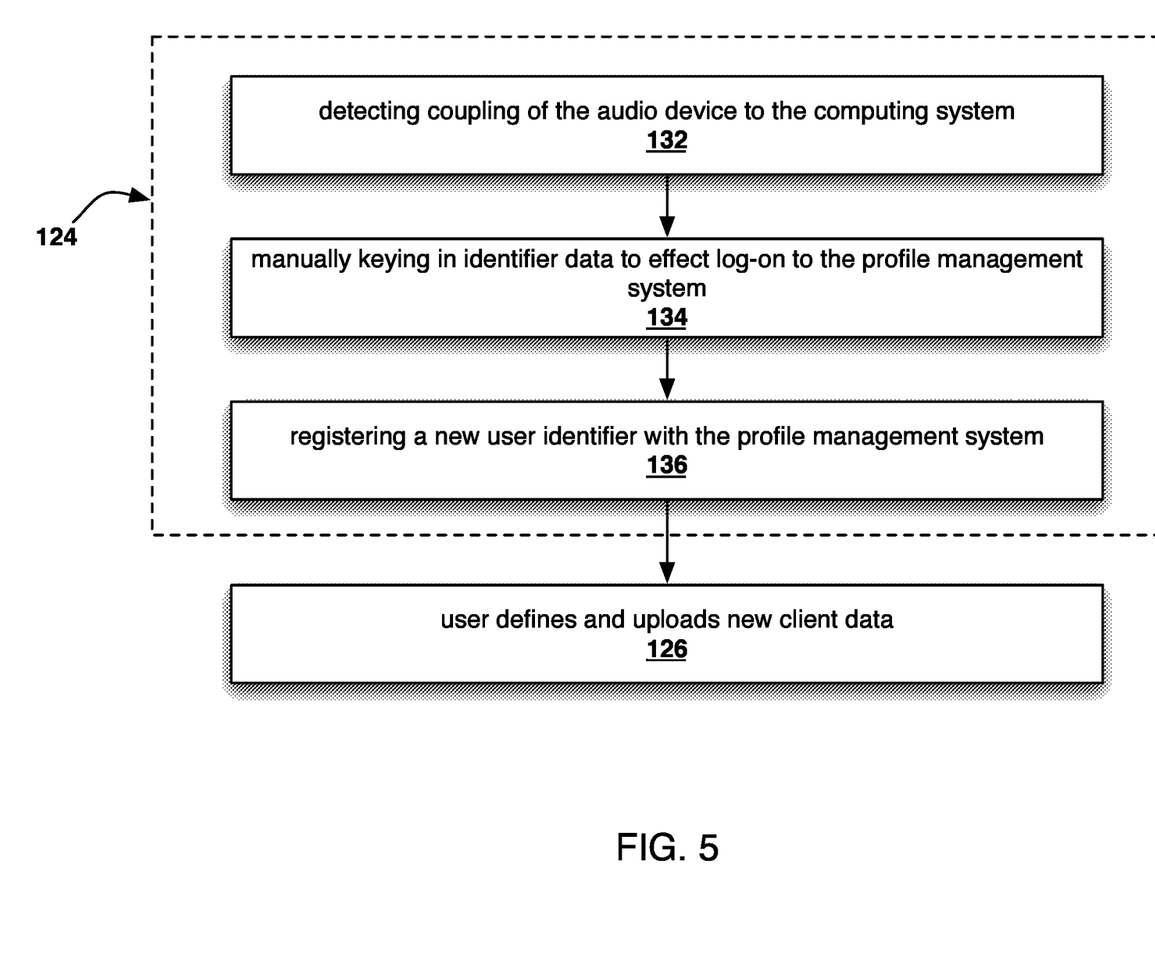
FIG. 5 shows a process flow diagram of a device discovery method for implementation by the computing systems of FIG. 3.

Complementary to and in association with the profile management method 100, there exists a device discovery method 116 configurable by the user for editing of data on the profile management system 24. The device discovery method 116 is preferably applied by the computing system 20. The device discovery method 116 comprises a step 124 of providing client data 29 for log-on to the profile management system 24 and a step 126 of uploading the device data 34 to the profile management system 24.

The step 124 further comprises at least one of a step 132 for detecting coupling of the audio device 18 to the computing system 20, a step 134 for manually keying in of identifier data 38 to effect log-on to the profile management system 24 and a step 136 for registering a new user identifier 40 with the profile management system 24. Preferably in the step 132, the computing system 20 detects signal communication of the audio device 18 with and generates the client data to effect an automated log-on to the profile management system 24 by associating the identifier data 38 with one of the device profiles 31. Alternatively, the user may configure settings of the device discovery method 116 such that a log-on prompt will be initiated for requesting provision of the identifier data 38 upon the computing system 20 detecting signal communication of the audio device 18 therewith. The user will then be required to manually key-in the identifier data 38 in the step 134 for access to the profile management system 24. In the step 136, a new user may register with the profile management system 24 by following through with a registration process. The registration process may request the new user to either manually key in new identifier data 38 to be stored on the storage module 30 as one of the user identifiers 40 or couple a new device to the computing system 20 for extraction of the identifier data 38 therefrom.

In the step 126, a user may define and upload new client data 24 onto the storage module 30 in the profile management system 24 under one of the user identifiers 40. The device data 34 in association with the client data 29 will be stored in the profile management system 24 as one of the device profiles 31. The configuration data 36 for new audio device settings and configuration will also be uploaded for storage by the profile management system 24 and will be registered as being associated with the newly created one of the device profiles 31. Preferably, the profile management system 24 allows for subsequent editing of the configuration data 36 after being uploaded to the storage module 30.

In the gaming context, for gamers who are always on the move, their preferred settings configurations for computer peripherals, either general settings or game-specific settings, are made storable and accessible through a multitude of devices and platforms. In LAN-gaming shops or at any public access terminal, gamers have their preferred settings configurations on the fly and downloadable via the profile management system 24 to any terminal or platform in network communication thereto. Users with new gaming devices can also utilise the profile management system 24 to obtain a set of basic setting configuration for the audio device 18 without having to manually configure control for any possible manipulation of the audio device 18. Update or modification of setting configurations from any computing system 20 in network communication with the profile management system 24 is also an available option.

Additionally, the profile management system 24 is able to process usage information and data stored in the storage module 30 for a variety of applications, including data analytics, and for access by users or third parties. The storage module 30 is preferably accessible by a third party. The third party includes, for example, a games developer, an advertiser or a network service provider. In addition, knowledge of the configuration preferences of users, in particular gamers, will enable game developers to design products that will better satisfy consumers.

In a non-gaming context, for example, when a user connects a HRTF-based headset device 50 to a profile management system 24 on the computing cloud 22, or when voice command memos are being downloaded from the HRTF-based headset device 50 to the computing system 20, configurations previously stored in the HRTF-based headset device 50 for manipulation of the audio device 18 as well as specific voice activated commands used previously in the HRTF-based headset device 50 can be downloaded from the profile management system 24 and thereby be used with the computing system 20, having the various settings, commands and controls mimicked seamlessly.

The profile management method 100 preferably resides on the profile management system 24 as a plurality of instructions stored on a non-transitory machine readable medium of the profile management system 24. It is preferred that the instructions, when executed, cause the profile management system 24 to perform the step of the profile management method 100. Similarly, the device discovery method 116 exists on the computing system 20 as a plurality of instructions stored on a non-transitory machine readable medium thereof. It is preferred that the instructions, when executed, cause the profile management system 24 to perform at least one of the steps of the device discovery method 116.

In a forgoing manner, a profile management method 100 and profile management system 24 are described according to exemplary embodiments of the invention. Although only a number of embodiments of the invention are disclosed in this document, it will be apparent to one skilled in the art in view of this disclosure that numerous changes and/or modifications can be made to the disclosed embodiments without departing from the scope and spirit of the invention.

The invention claimed is:

1. An audio device comprising:
a storage module configured to store a control function, the control function being associated with a head-related structure of a user;
wherein the storage module is further configured to store a plurality of programming instructions;
a processor for receiving audio signals being descriptive of audio sounds and spatial positions corresponding with the audio sounds, the processor for processing the received audio signals into control signals based on the control function;
a transducer for transducing control signals into the audio sounds for delivery to the user when the audio device is in use thereby, the spatial positions of the audio sounds being processed by the processor to conform with the head-related structure of the user based on the control function;
wherein the processor is further configured to execute the plurality of programming instructions to cause communication of signals between the audio device, a computing system and a computing cloud, both of which the audio device may be coupled to, during the running of various functions as programmed in the programming instructions;
wherein the control function is downloadable to the storage module from the computing cloud, through the computing system, upon execution of the plurality of programming instructions; and
a microphone which comprises a measurement guide that is configured to determine information related to one or more of a shape, a size and a pinnae of the user's ears;
wherein the measurement guide corresponds to a length of the microphone; and
wherein the head-related structure of the user includes one or more of the shape, the size and the pinnae of the user's ears.

2. The audio device of claim 1, wherein the audio device is a HRTF-based headset device.

3. The audio device of claim 2, wherein the user settings further comprise at least one of:
the connection of the HRTF-based headset device's jack plug to the computing system's jack socket;
wireless coupling of the HRTF-based headset device with the computing system;
detection of sound input through a transducer of the HRTF-based headset device;
volume adjustment via volume controls coupled to the HRTF-based headset device;
sound channel adjustment and selection via sound channel adjustment/selection controls coupled to the HRTF-based headset device;
volume adjustment of each sound channel via sound channel volume controls attached to the HRTF-based headset device;
selection of at least one of a plurality of virtualized ear pinnae configurations from a database for calibration of the HRTF-based headset device; and
inputting of user settings through an interface for calibration of the HRTF-based headset device.

4. The audio device of claim 3, wherein individual physical configurations in relation to the user's ears comprise at least one of a shape, size and pinnae of each of the user's ears.

5. The audio device of claim 3, wherein the plurality of virtualized ear pinnae configurations are indicative of at least a majority of the human population.

6. The audio device of claim 3, wherein the database of virtualized ear pinnae configurations is stored on the storage module within at least one of the HRTF-based headset device, the computing system coupled to the HRTF-based headset device and on the computing cloud which is coupled to the HRTF-based headset device.

7. The audio device of claim 1, wherein audio output transmitted by the transducer of the audio device comprises audio output based on the user settings of the audio device.

8. The audio device of claim 7, wherein the processor processes source material of the audio output transmitted by the transducer, based on the user settings of the audio device.

9. The audio device of claim 1, wherein the storage module is a built-in flash memory or a removable memory disk.

10. The audio device of claim 1,
wherein the audio device is configured to communicate with a profile management system such that the audio device receives from the profile management system an audio setting, for the audio device, that is associated with a user identifier.

11. The audio device of claim 1,
wherein the audio device is configured to communicate with a profile management system such that the audio device receives from the profile management system a configuration data, for configuring use of the audio device with a computer, that is based on a device type of the audio device.

12. An audio device comprising:
a storage module configured to store a control function, the control function being associated with one or more of a shape, a size and a pinnae of a user's ears;
wherein the storage module is further configured to store a plurality of programming instructions;
a processor for receiving audio signals being descriptive of audio sounds and spatial positions corresponding with the audio sounds, the processor for processing the received audio signals into control signals based on the control function;
a transducer for transducing control signals into the audio sounds for delivery to the user when the audio device is in use thereby, the spatial positions of the audio sounds being processed by the processor to conform with the one or more of the shape, the size and the pinnae of the user's ears based on the control function;
wherein the processor is further configured to execute the plurality of programming instructions to cause communication of signals between the audio device, a computing system and a computing cloud, both of which the audio device may be coupled to, during the running of various functions as programmed in the programming instructions;
wherein the control function is downloadable to the storage module from the computing cloud, through the computing system, upon execution of the plurality of programming instructions; and a microphone which comprises a measurement guide that is configured to determine information related to the one or more of the shape, the size and the pinnae of the user's ears;

wherein the measurement guide corresponds to a length of the microphone.

* * * * *